United States Patent
Yamasaki (10) Patent No.: US 11,731,441 B2
(45) Date of Patent: Aug. 22, 2023

(54) PRINTING DEVICE, PRINT CONTROLLING METHOD, AND STORAGE MEDIUM

(71) Applicant: CASIO COMPUTER CO., LTD., Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/574,802

(22) Filed: Jan. 13, 2022

(65) Prior Publication Data

US 2022/0227149 A1 Jul. 21, 2022

(30) Foreign Application Priority Data

Jan. 18, 2021 (JP) ................. 2021-005772

(51) Int. Cl.
*B41J 25/00* (2006.01)
*A45D 29/00* (2006.01)
*B41J 3/407* (2006.01)
*B41J 2/21* (2006.01)
*B41J 2/11* (2006.01)
(Continued)

(52) U.S. Cl.
CPC ............ *B41J 25/005* (2013.01); *A45D 29/00* (2013.01); *B41J 2/2132* (2013.01); *B41J 3/4073* (2013.01); *A45D 2029/005* (2013.01); *B41J 2/11* (2013.01); *G06K 15/021* (2013.01); *G06K 15/107* (2013.01)

(58) Field of Classification Search
CPC ...... B41J 25/005; B41J 2/2132; B41J 3/4073; B41J 2/11; A45D 2029/005; A45D 29/00; G06K 15/021; G06K 15/107
See application file for complete search history.

(56) References Cited

U.S. PATENT DOCUMENTS

2004/0036894 A1* 2/2004 Murata .............. G06K 15/1851
358/1.6
2013/0077103 A1* 3/2013 Asako ................ H04N 1/6097
358/1.2

FOREIGN PATENT DOCUMENTS

JP 2003231247 A * 8/2003 .............. B41J 11/42
JP 2003-534083 A 11/2003
JP 2012-061841 A 3/2012
(Continued)

OTHER PUBLICATIONS

JPO; Application No. 2021-005772; Notice of Reasons for Refusal dated Apr. 4, 2023.

*Primary Examiner* — Yaovi M Ameh
(74) *Attorney, Agent, or Firm* — Fitch, Even, Tabin & Flannery LLP (57) ABSTRACT

A printing device includes a printing head with nozzles, a movement mechanism that moves the printing head, and at least one processor. The processor controls the printing head to eject ink from each of the nozzles and to print on each position in a printing target area while causing the movement mechanism to move the printing head; and upon superposing printings in the printing target area based on pieces of data that are different from each other, controls the printing head to eject ink from at least one of the nozzles in each printing onto a different position from a position in a previous printing based on a different piece of data among the pieces of data for each of the superposing printings. The pieces of data is used in specifying from which of the nozzles ink is ejected onto each position in a printable area of the printing device.

11 Claims, 8 Drawing Sheets

(51) Int. Cl.
  *G06K 15/02* (2006.01)
  *G06K 15/10* (2006.01)

(56) References Cited

FOREIGN PATENT DOCUMENTS

| | | |
|---|---|---|
| JP | 2013-067127 A | 4/2013 |
| JP | 2017-077269 A | 4/2017 |
| JP | 2017-149113 A | 8/2017 |
| JP | 2018-153526 A | 10/2018 |
| JP | 2020-178925 A | 11/2020 |
| WO | 01/91598 A1 | 12/2001 |

* cited by examiner

| 1 | 2 | 3 | 4 | 1 | 2 | 3 | 4 |
|---|---|---|---|---|---|---|---|
| 4 | 3 | 2 | 1 | 4 | 3 | 2 | 1 |
| 5 | 6 | 7 | 8 | 5 | 6 | 7 | 8 |
| 8 | 7 | 6 | 5 | 8 | 7 | 6 | 5 |
| 1 | 2 | 3 | 4 | 1 | 2 | 3 | 4 |
| 4 | 3 | 2 | 1 | 4 | 3 | 2 | 1 |
| 5 | 6 | 7 | 8 | 5 | 6 | 7 | 8 |
| 8 | 7 | 6 | 5 | 8 | 7 | 6 | 5 |

FIG.6B

| 4 | 1 | 8 | 5 | 4 | 1 | 8 | 5 |
|---|---|---|---|---|---|---|---|
| 3 | 2 | 7 | 6 | 3 | 2 | 7 | 6 |
| 2 | 3 | 6 | 7 | 2 | 3 | 6 | 7 |
| 1 | 4 | 5 | 8 | 1 | 4 | 5 | 8 |
| 4 | 1 | 8 | 5 | 4 | 1 | 8 | 5 |
| 3 | 2 | 7 | 6 | 3 | 2 | 7 | 6 |
| 2 | 3 | 6 | 7 | 2 | 3 | 6 | 7 |
| 1 | 4 | 5 | 8 | 1 | 4 | 5 | 8 |

FIG.6C

| 5 | 6 | 7 | 8 | 5 | 6 | 7 | 8 |
|---|---|---|---|---|---|---|---|
| 8 | 7 | 6 | 5 | 8 | 7 | 6 | 5 |
| 1 | 2 | 3 | 4 | 1 | 2 | 3 | 4 |
| 4 | 3 | 2 | 1 | 4 | 3 | 2 | 1 |
| 5 | 6 | 7 | 8 | 5 | 6 | 7 | 8 |
| 8 | 7 | 6 | 5 | 8 | 7 | 6 | 5 |
| 1 | 2 | 3 | 4 | 1 | 2 | 3 | 4 |
| 4 | 3 | 2 | 1 | 4 | 3 | 2 | 1 |

PRINTING DEVICE, PRINT CONTROLLING METHOD, AND STORAGE MEDIUM

CROSS-REFERENCE TO RELATED APPLICATIONS

The present application is based upon and claims the benefit of priority from Japanese Patent Application No. 2021-005772 filed on Jan. 18, 2021, whose descriptions, claims, abstracts, and drawings are incorporated herein by reference in its entirety.

BACKGROUND

Technical Field

The present invention relates to a printing device, a print controlling method, and a storage medium

Description of Related Art

Conventionally, there are known printing devices (nail printers) that print nail designs on fingernails, toenails, and the like (see, for example, JP 2003-534083 A).

Such printing devices may, for example, form a base layer in white ink or the like on the fingernail before printing the nail design in order that the color of the nail itself does not affect the finish of printing on the nail.

SUMMARY

According to an aspect of the present disclosure, there is provided a printing device including:
a printing head that has a plurality of nozzles;
a movement mechanism that moves the printing head; and
at least one processor that:
controls the printing head to eject ink from each of the plurality of nozzles and to print on each position in a printing target area while causing the movement mechanism to move the printing head; and
upon superposing printings of a plurality of times in the printing target area based on a plurality of pieces of data that are different from each other, controls the printing head to eject ink from at least one of the plurality of nozzles in each printing onto a different position from a position in a previous printing based on a different piece of data among the plurality of pieces of data for each of the superposing printings, the plurality of pieces of data being used in specifying from which of the plurality of nozzles ink is ejected onto each position in a printable area of the printing device.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein.

DETAILED DESCRIPTION

With reference to FIG. 1 to FIG. 9D, an embodiment of a printing device, a print controlling method, and a storage medium storing a program according to the present disclosure will be described.

In the embodiment described below, various limitations technically preferable for carrying out the present disclosure are disclosed. However, the scope of the present disclosure is not limited to the embodiment below or illustrated examples.

The printing device of the present embodiment prints by ejecting ink onto a printing target area. For example, a nail of a finger is set to be a printing target, and, depending on the nail design, a predetermined area of the nail is set to be the printing target area where nail printing is to be performed.

The printing target of the printing device in the present disclosure may be other than those shown here, for example, the printing target may be a nail of a toe finger. Alternatively, the printing target may be a nail-like object other than a human nail, such as a nail chip or the surface of various accessories, or various sheets or stickers.

Figure 1:
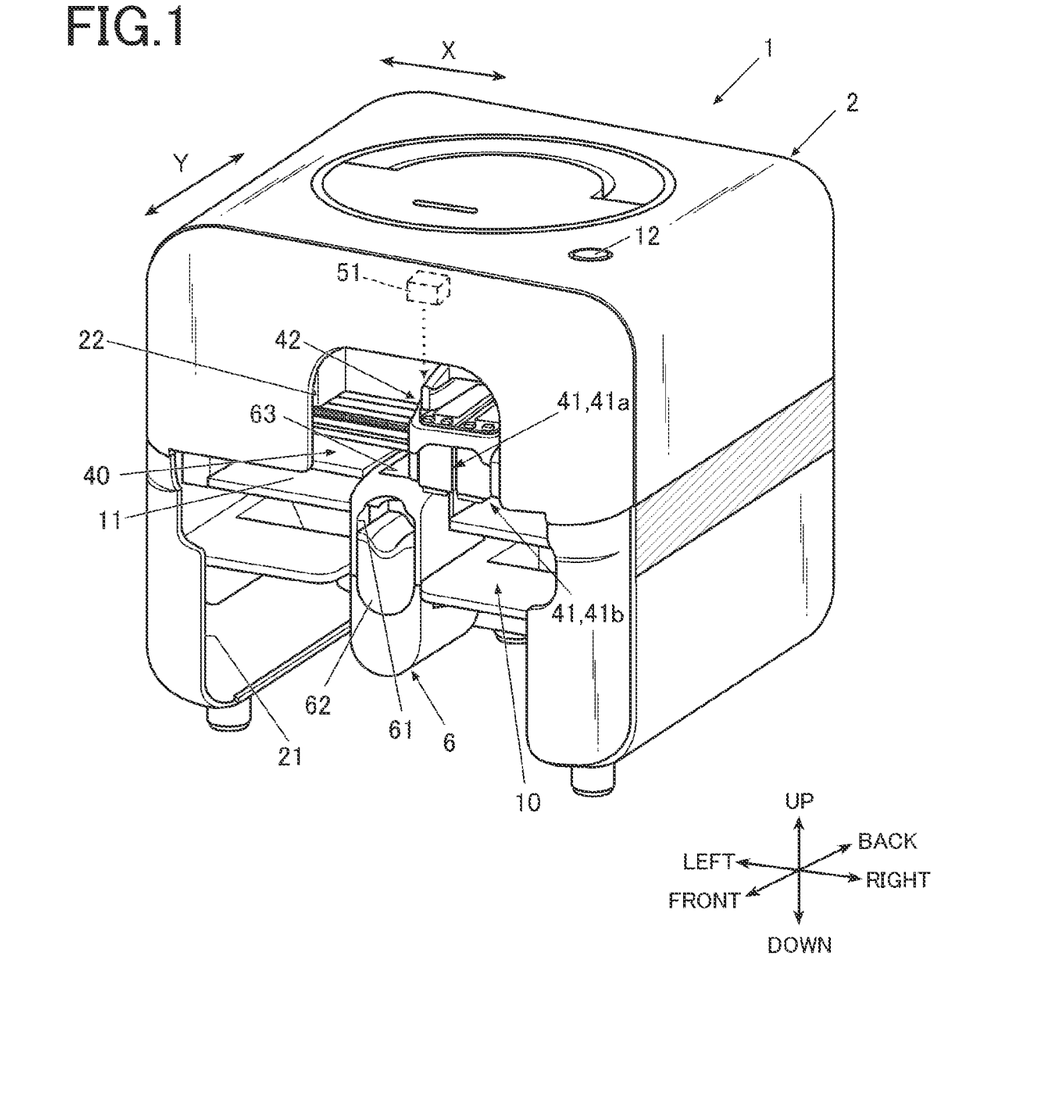
FIG. 1 is a diagram showing a schematic configuration of a printing device in the present embodiment.
Figure 2:
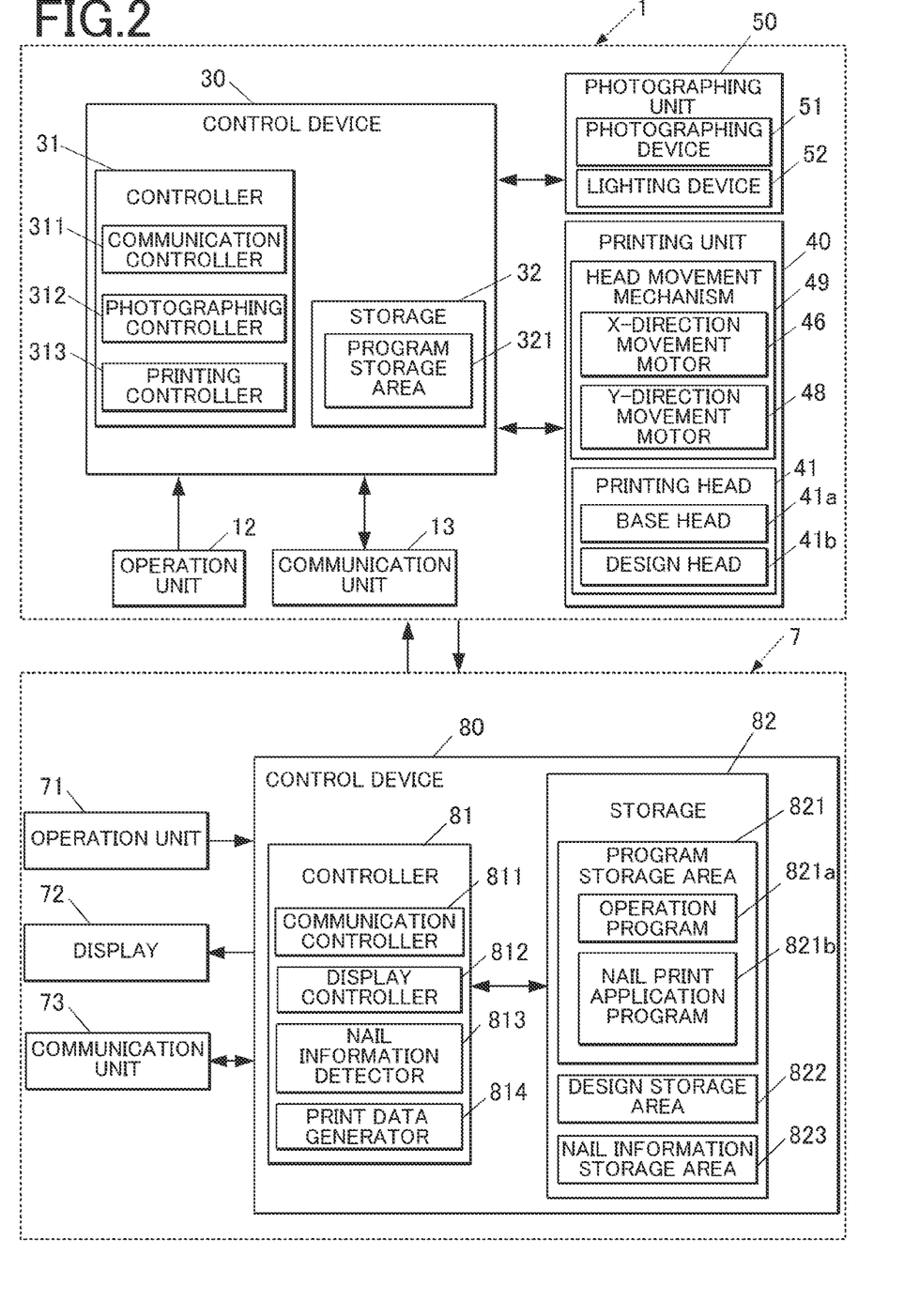
FIG. 2 is a main part block diagram showing a control structure of the printing device in the present embodiment and a terminal device cooperating therewith.

FIG. 1 is a perspective view showing a main external configuration of the printing device in the present embodiment. FIG. 2 is a main part block diagram showing the main control configuration of the printing device in the present embodiment.

In the following embodiment, up and down, left and right, and front and back are defined as the directions shown in FIG. 1. An X direction and a Y direction are defined as the directions shown in FIG. 1. The X direction is the main scanning direction, and the Y direction is the sub-scanning direction.

As shown in FIG. 2, the printing device 1 of the present embodiment and an external terminal device (a terminal device 7 in FIG. 2) are configured to be able to communicate and cooperate with each other.

As shown in FIG. 1, the printing device 1 has a housing 2 that is formed in an almost box shape.

The housing 2 has an opening 21 formed in the lower part of the front surface (the front surface side of the printing device 1, the front side in FIG. 1) almost entirely in the left-right direction (in the lateral direction of the printing device 1, left-right direction or X direction in FIG. 1). Also, a cut-out 22 that is continuous with the upper side of the opening 21 is formed almost at the middle of the left-right direction of the housing 2. The cut-out 22 functions as an entrance and exit when a printing head 41 is attached to and detached from the device, which will be described later.

On the upper surface (top panel) of the housing 2, there is an operation unit 12 of the printing device 1. The operation unit 12 is, for example, an operation button (a power switch button) that turns the power of the printing device 1 on and off. When the operation unit 12 is operated, an operation signal is output to the control device 30, and the control device 30 controls and operates each part of the printing device 1 depending on the operation signal. For example, when the operation unit 12 is a power switch button, the power of the printing device 1 is turned on and off depending on the button operation.

Alternatively, each part of the printing device 1 may be operated depending on the operation signal input from the operation unit 71 of the terminal device 7 described later, instead of the operation unit 12.

An external configuration of the printing device 1, the shape of each part of the housing 2, the arrangement of each part, and the like are not limited to the illustrated example, and can be set as needed. For example, the operation unit 12 may be provided not on the upper surface of the housing 2 but on the side surface or the back surface. In addition, various operation buttons may be further provided as the operation unit 12 on the housing 2, and various displays, indicators, and the like may also be provided.

The housing 2 contains a device body 10.

The device body 10 includes a base 11, a finger holder 6 attached to the base 11, a printing unit 40, and the like.

The finger holder 6 is arranged almost in the middle in the left-right direction (X direction) on the front surface side of the device in the base 11, and holds a finger with a nail (both not shown in the drawings), which is the printing target in the present embodiment, at a position suitable for printing.

As shown in FIG. 1, the finger holder 6 has an opening 61 on the front surface side of the device. The finger holder 6 has a finger fixing member 62 in it. When a finger is inserted through the opening 61, the finger fixing member 62 pushes up and supports the finger from below. The finger fixing member 62 is made of a flexible resin, for example.

On the upper surface of the back side (rear side of the device) of the finger holder 6, a window 63 is formed so as to expose the nail of the finger inserted through the opening 61 and held by the finger fixing member 62. In addition, in the finger holder 6, there is a nail placing unit (not shown in the drawings) where the tip of the nail is placed. An upper surface of the finger holder 6 in front of (on the front side of the device of) the window 63 functions as a finger press (not shown in the drawings) that specifies an upper surface position of the finger.

The tip of the nail is placed on the nail placing unit, and the upper surface position of the finger is specified by the finger press, such that the finger inserted into the finger holder 6 is held at a proper position suitable for printing by the printing head 41.

The printing unit 40 prints on the printing target area (nail) according to printing data that is generated by a print data generator 814 described later (a controller 81 of the terminal device 7 described later, see FIG. 2).

The printing unit 40 includes a head that performs printing operations (hereinafter referred to as the "printing head 41"), a carriage 42 on which the printing head 41 is mounted and held, and the head movement mechanism (see FIG. 2) that moves the printing head 41 and the carriage 42.

As shown in FIG. 1, the printing head 41 is mounted on the carriage 42.

The printing device 1 has a plurality of heads that print on the printing target area (nail) in different colors from each other. In the present embodiment, a base head 41a and a design head 41b are mounted as the printing heads 41. In the following, when the term "printing head 41" is used simply, it refers to both the base head 41a and the design head 41b. The arrangement of the base head 41a and the design head 41b is not limited to the example illustrated in the drawings.

Before a design is printed, the base head 41a prints a base on the printing target area where a design is to be printed. A liquid (hereinafter referred to as a "base ink") used for printing the base is preferably a white or near-white colored fluid so that ink has a good coloring property when the design is printed.

The design head 41b prints a design on the printing target area where the base has been printed by the base head 41a, and is capable of ejecting ink(s) of respective color(s) (hereinafter referred to as "colored ink(s)"), such as cyan (C), magenta (M), yellow (Y), and the like. The color inks that can be ejected by the design head 41b are not limited to these, and inks of other colors may also be ejected.

In the present embodiment, the base head 41a and the design head 41b have respective ink ejection surfaces (not shown in the drawings) that face the nail surface and have a plurality of nozzles (for example, nozzles 1 to 8 in FIG. 4) from each of which ink is ejected. Both the base head 41a and the design head 41b are inkjet heads for the inkjet method where fine droplets of ink are made and sprayed directly from the ink ejection surface to a nail surface (a surface to be printed) of the printing target (nail).

The head movement mechanism 49 moves the printing head 41, and includes an X-direction movement mechanism (not shown in the drawings) and a Y-direction movement mechanism (not shown in the drawings). The X-direction movement mechanism moves the printing head 41 in the left-right direction (X-direction) of the device, which is the main scanning direction, and the Y-direction movement mechanism moves the printing head 41 in the front-back direction (Y-direction) of the device, which is the sub-scanning direction.

The X-direction movement mechanism includes an X-direction movement motor 46 and moves the printing head 41 in the left-right direction (X-direction) of the device when the X-direction movement motor 46 is driven. The Y-direction movement mechanism includes a Y-direction movement motor 48 and moves the printing head 41 in the front-back direction (Y-direction) of the device when the Y-direction movement motor 48 is driven.

The operations of the X-direction movement motor 46 and the Y-direction movement motor 48 of the head movement mechanism 49, and the printing head 41 are controlled by a printing controller 313 (see FIG. 2) of the control device 30.

At an inner side of the upper surface (top plate) of the housing 2 and above the window 63 of the finger holder 6, there is an photographing unit 50 that photographs a nail (a finger including the nail) exposed through the window and acquires an image of the nail (an image of the finger including the nail, hereinafter referred to as a "nail image").

The photographing unit 50 includes a photographing device 51, which is a camera, for example, and a lighting device 52 constituted by white LEDs, etc., which illuminates the nail to be photographed (see FIG. 2).

This photographing unit 50 is connected to a photographing controller 312 (see FIG. 2) of the control device 30 described later, and is controlled by the photographing controller 312.

The nail image photographed by the photographing device 51 is acquired by the photographing controller 312 and sent to the cooperating terminal device 7 as appropriate.

Image data of the image photographed by the photographing unit 50 may be stored in a storage 32 described later.

In the example of the present embodiment, the photographing device 51 and the lighting device 52 are inside of the top surface of the housing 2 and are fixedly arranged so as to face the nail (the surface of the nail) of the finger placed on the finger holder 6. However, the specific arrangement of the photographing unit 50 is not particularly limited, as long as it is in a position where the nail of the finger placed on the finger holder 6 can be photographed.

For example, the photographing unit 50 may be configured to be movable in the X direction and in the Y direction by the head movement mechanism 49 that moves the printing head 41.

The control device 30 mounted in the printing device 1 is a computer that includes a controller 31 (see FIG. 2) configured with at least one processor such as a CPU (Central Processing Unit) (not shown in the drawings), and a storage (see FIG. 2) configured with at least one memory such as ROM (Read Only Memory) and RAM (Random Access Memory) (both not shown in the drawings).

The storage 32 has a program storage area 321 in which various programs and the like for operating the printing device 1 are stored. In the program storage area 321, various programs such as a printing program for printing processing are stored. The controller 31 expands these programs in the working area of RAM, for example, and executes the programs to totally control various parts of the printing device 1.

The controller 31, when viewed functionally, includes a communication controller 311, the photographing controller 312, the printing controller 313, and the like. The functions as the communication controller 311, the photographing controller 312, the printing controller 313, and the like are realized through cooperation between the controller 31 and the programs stored in the program storage area 321 of the storage 32.

The communication controller 311 controls operations of a communication unit 13.

The communication unit 13 includes a wireless communication module and the like that can communicate with the communication unit 73 of the terminal device 7. The communication controller 311 controls the operation of the communication unit 13 when sending and receiving various kinds of data and the like between the printing device 1 and the terminal device 7.

The printing device 1 of the present embodiment prints a nail design (hereinafter also simply referred to as a "design") in cooperation with the terminal device 7 described later. For example, data of the design to be printed on the nail is stored in the terminal device 7, and the communication controller 311 controls the communication by the communication unit 13 as appropriate, and acquires the data of the design from the terminal device 7 via the communication unit 13.

Also, as described later, the image acquired by the photographing unit 50 of the printing device 1 is appropriately sent to the terminal device 7, and the controller 81 (a nail information detector 813 described later) of the terminal device 7 detects various kinds of nail information based on the acquired image. Furthermore, in the present embodiment, the controller 81 (a print data generator 814 described later) of the terminal device 7 generates printing data based on the nail information. The various kinds of information and printing data that are detected and generated in the terminal device 7 are sent from the terminal device 7 to the printing device 1 via the communication units 13, 73.

The communication between the printing device 1 and the terminal device 7 may be one that uses a network line such as the Internet, or wireless communication based on a short-distance wireless communication standard such as Bluetooth (registered trademark), Wi-Fi, or the like. In a communication via a network, any network line may be used for the communication. The communication between the printing device 1 and the terminal device 7 is not limited to wireless communication, but various kinds of data may be configured to be sent and received between them through a wired connection.

The communication unit 13 needs only to be communicable with the terminal device 7. The applicable communication unit 13 uses a communication standard consistent with that of the communication unit 73 of the terminal device 7.

The photographing controller 312 controls the photographing device 51 and the lighting device 52 of the photographing unit 50 and causes the photographing device 51 to photograph an image of a finger including an image of a nail of the finger (the nail image) placed on the finger holder 6.

The image of the nail (nail image) acquired by the photographing unit 50 is sent to the photographing controller 312. The photographing controller 312 acquires data of the nail image. The photographing controller 312 may store the nail image in the storage 32.

The printing controller 313 controls the printing unit 40 to print on the printing target area corresponding to the nail (the printing target) according to the printing data generated in the printing data generator 814 described later.

Specifically, the printing controller 313 outputs a control signal to the printing unit 40 based on the printing data to cause the printing head 41 to eject ink from any of the plurality of nozzles 1 to 8 onto each position in the printing target area corresponding to the nail (the printing target) while moving the printing head 41 with the X direction movement motor 46 and the Y direction movement motor 48 with respect to the printing target area that has been fixed, so as to control the printing unit 40 to print on the printing target area.

In addition, as mentioned above, the printing device 1 of the present embodiment prints on a nail in cooperation with the terminal device 7.

The terminal device 7 is a portable terminal device such as a smart phone. The terminal device 7 is not limited to a smart phone. The terminal device 7 may be, for example, a tablet-type personal computer (hereinafter referred to as a "PC"), a notebook PC, a stationary PC, or a terminal device for games. As shown in FIG. 2, the terminal device 7 includes an operation unit 71, a display 72, a communication unit 73, and a control device 80.

The operation unit 71 is, for example, a touch panel integrally provided on the surface of the display 72 and is capable of performing various inputs, settings, and the like in response to user operations. When the operation unit 71 is operated, the input signal corresponding to the operation is sent to the controller 81.

Various operation screens are displayed on the touch panel configured on the display 72 according to the control by the display controller 812 described later, and allows the user to perform various input and setting operations by touching the touch panel.

The operation unit 71 for the various input and setting operations is not limited to the touch panel. For example, various operation buttons, a keyboard, a pointing device, and the like may be provided as the operation unit 71.

In the present embodiment, when the user operates the operation unit 71, the terminal device 7 outputs various instructions such as a printing start instruction to the printing device 1, and the terminal device 7 also functions as the operation unit of the printing device 1.

Also, by operating the operation unit 71, the user can select the nail design (design) to be printed on the nail.

The display 72 is configured, for example, with a liquid crystal display (LCD), an organic electroluminescent display, or other flat display.

As described above, a touch panel for various inputs may be integrally configured on the surface of the display 72. In this case, the touch panel functions as the operation unit 71.

In the present embodiment, nail designs that are input and selected by the user via the operation unit 71, various guidance screens, warning display screens, and the like can be displayed on the display 72.

The communication unit 73 is configured to be able to communicate with the communication unit 13 of the printing device 1.

The specific method of communication between the printing device 1 and the terminal device 7 is not limited, and may be either a wireless connection method or a wired connection method, as described above. The communication unit 73 is not limited as long as it is communicable with the printing device 1. The applicable communication unit 73 uses a communication standard consistent with that of the communication unit 13 of the printing device 1.

The communication unit 73 is connected to the communication controller 811 (see FIG. 2) of the control device 80 (described later), and is controlled by the communication controller 811.

As shown in FIG. 2, the control device 80 of the terminal device 7 of the present embodiment is a computer having the controller 81 composed of a processor such as a CPU (Central Processing Unit) not shown in the drawings, and a storage 82 composed of ROM (Read Only Memory) and RAM (Random Access Memory) not shown in the drawings.

Various programs, various kinds of data, and the like are stored in the storage 82 for operating each part of the terminal device 7.

Specifically, in the ROM and the like of the present embodiment, in addition to an operation program 821a that totally control various parts of the terminal device 7, a nail print application program 821b for nail printing using the printing device 1 (hereinafter referred to as a "nail print AP") is stored. The controller 81 expands these programs in the working area of RAM, for example, and executes the programs to totally control the various parts of the terminal device 7.

In addition, the storage 82 of the present embodiment has a design storage area 822 for storing nail design (design) data, a nail information storage area 823, and the like. In the nail information storage area 823, various kinds of information on nails detected by the nail information detector 813 (described later) are stored.

The nail design (design) stored in the design storage area 822 may be an existing design prepared in advance or a design created by the user. In addition, when the terminal device 7 can be connected to various networks, it may be possible to import nail designs (designs) stored in a server device or the like (not shown in the drawings) that is connectable to the network.

The controller 81 of the terminal device 7, when viewed functionally, has a communication controller 811, a display controller 812, a nail information detector 813, a print data generator 814, and the like. The functions as the communication controller 811, the display controller 812, the nail information detector 813, the print data generator 814, and the like are realized through cooperation between the CPU of the controller 81 and the program stored in the ROM of the storage 82.

The communication controller 811 controls the operation of the communication unit 73.

The display controller 812 controls the display 72 and displays various display screens on the display 72.

The nail information detector 813 detects nail information regarding a nail based on an image of the nail (a nail image) acquired by the photographing controller 312 of the printing device 1. In the present embodiment, the nail information detected by the nail information detector 813 is nail outline information that delineate an area of the nail.

The nail information detected by the nail information detector 813 is not limited to this.

The nail information detected by the nail information detector 813 may include, for example, an angle of inclination of the surface of the nail with respect to an XY plane (an inclination angle of the nail, nail curvature). In addition, when the height of the nail (vertical position of the nail) can be acquired from the image or the like photographed by the photographing device 51, the nail information may also include the height of the nail.

The various kinds of information detected by the nail information detector 813 are stored in the nail information storage area 823. In the present embodiment, the various kinds of information detected by the nail information detector 813 may be sent to the printing device 1. The various processes based on the nail information may be performed by the printing device 1.

The print data generator 814 generates printing data by matching the desired design to the nail area detected by the nail information detector 813.

For example, the print data generator 814 cuts out image data of the nail design (design) selected by the user, fits it to the nail area detected from the nail image by appropriately scaling the image data up and down, adjusting the layout, and the like, and generates design printing data.

Next, the operation of the printing device 1 will be described.

Figure 3:
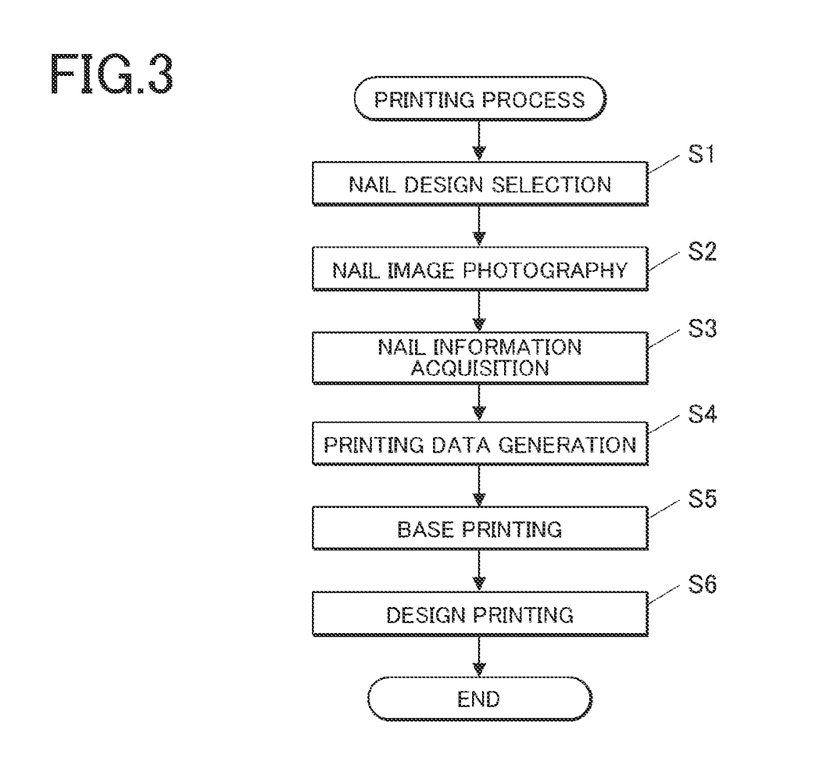
FIG. 3 is a flowchart showing the flow of printing processing by the printing device in FIG. 1.

FIG. 3 is a flowchart showing the flow of the printing processing executed by the printing device 1. The printing processing shown in FIG. 3 is executed, for example, when the power of the printing device 1 is turned on, in cooperation with the controller 31 shown in FIG. 2 and a program stored in the program storage area 321 of the storage 32.

First, the controller 31 causes the user to select the nail design to be printed on the nail (the printing target) using the terminal device 7 (Step S1).

For example, the controller 31 as the communication controller 311 controls, via the communication unit 13, to instruct the terminal device 7 to display a selection screen of nail design. When the terminal device 7 receives the instruction on nail design selection from the printing device 1 via the communication unit 73, the display controller 812 causes the display 72 to display a selection screen of nail designs stored in the design storage area 822. When the user operates the operation unit 71 to select a nail design, the image data of the selected nail design in the design storage area 822 is read by the RAM.

Next, the controller 31 prompts the finger corresponding to the nail (the printing target) to be placed on the finger holder 6, and the photographing controller 312 causes the photographing unit 50 to photograph and acquire the nail image (Step S2).

For example, the controller 31 as the communication controller 311 instructs, via the communication unit 13, the terminal device 7 to display a notification screen that prompts the user to set the finger corresponding to the nail (the printing target) on the finger holder 6. When the terminal device 7 receives an instruction from the printing device 1 via the communication unit 73, the display controller 812 causes the display 72 to display a notification screen that prompts the user to set the finger corresponding to the nail (the printing target) on the finger holder 6 and instructs the printing device 1 to start printing. Upon instruction to start printing via the operation unit 71, the controller 81 as the communication controller 811 sends the printing start instruction to the printing device 1 via the communication unit 73.

In the printing device 1, when the finger to be printed is placed on the finger holder 6 and the communication unit 13 receives the printing start instruction, the controller as the photographing controller 312 causes the photographing unit 50 to photograph and acquire the nail image.

Next, the controller 31 as the communication controller 311 causes the communication unit 13 to send the image data of the nail image acquired by the photographing unit 50 to the terminal device 7, causes the terminal device 7 to acquire nail information from the nail image (Step S3), and instructs the terminal device 7 to generate printing data (Step S4).

When the terminal device 7 receives the nail image from the printing device 1 via the communication unit 73, the nail information detector 813 of the controller 81 detects the nail outline shape (nail area) from the nail image and acquires the nail outline information (nail area information). Then, based on the acquired nail outline information, the print data generator 814 generates printing data, and the communication controller 811 sends the printing data to the printing device 1 via the communication unit 73.

Here, the print data generator 814 cuts the image data of the nail design depending on the outline shape of the nail (the printing target), scales it up or down as appropriate, identifies the printing target area corresponding to the nail (the printing target), and generates printing data for the design that indicates the color to be ejected at each position (each pixel position) of the printing target area. The nail design may be one for which printing is performed on the entire nail, and in such a case, the printing target area is the same as the outline shape of the nail. Alternatively, the nail design may be one for which printing is performed on a part of the nail, such as a French nail. In this case, the printing target area is the nail design area corresponding to the nail. The print data generator 814 generates base printing data for instructions on printing with the base ink in the entire printing target area.

In the printing device 1, when the communication unit receives the printing data, the controller 31 as the printing controller 313 controls the X direction movement motor 46, the Y direction movement motor 46, and the base head 41a based on the base printing data to perform the base printing in the printing target area of the nail (printing target) placed on the finger holder 6 (step S5).

Next, the controller 31 as the printing controller 313 controls the X direction movement motor 46, the Y direction movement motor 46, and the design head 41b based on the design printing data to print the design in the printing target area of the nail (printing target) placed on the finger holder 6 (step S6) and finishes the printing processing.

Figure 4:
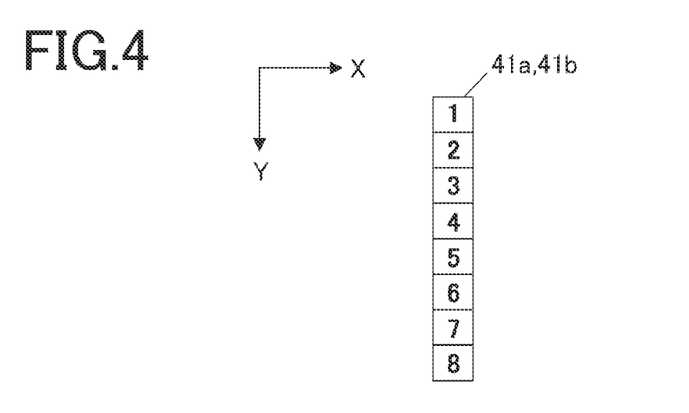
FIG. 4 is a diagram schematically showing a configuration of a base head and a design head.

Here, the base printing in step S5 is performed using a multi-pass method. Hereinafter, an example of the base printing of the present embodiment will be explained when the base head 41a has eight nozzles (nozzles 1 to 8) as shown in FIG. 4.

In multi-pass printing, it is determined in advance from which of the plurality of nozzles (nozzles 1 to 8 in FIG. 4 in the present embodiment) of the printing head 41 the ink is ejected onto each position where ink is to land (each pixel position), and several scans are made in the main scanning direction (X direction in FIG. 1). This prevents ejection of ink from a single nozzle onto consecutive pixels, thus reducing the influence of error nozzles (nozzles having defects) on image quality.

The multi-pass printing is controlled by using a mask pattern. The mask pattern is a table (data) that specifies from which of the nozzles 1 to 8 of the printing head 41 the ink is to be ejected onto each position (each pixel position) in the printable area by the printing device 1.

Figure 5A:
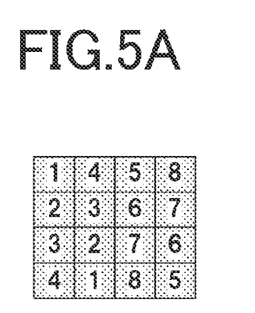
FIG. 5A is a diagram showing an example of a mask pattern of 4 pixels by 4 pixels.
Figure 5B:
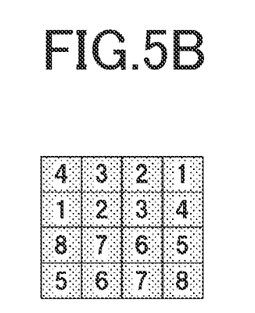
FIG. 5B is a diagram showing an example of a mask pattern that is different from the mask pattern in FIG. 5A.
Figure 5C:
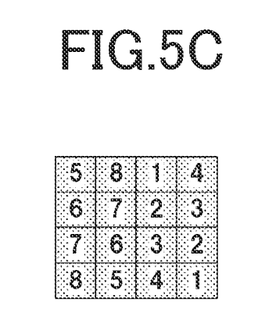
FIG. 5C is a diagram showing an example of a mask pattern that is different from the mask pattern in FIG. 5A.

FIG. 5A to FIG. 5C show examples of mask patterns for printing in an area of 4 pixels by 4 pixels. For example, it is shown that ink is ejected from the nozzle 1 onto the pixel at position "1" of the mask pattern, and from the nozzle 4 onto the pixel at position "4". In the mask pattern, the same nozzle number is not arranged successively in neighboring pixels. This makes it possible to control the printing head not to eject ink successively from a single nozzle.

For example, when a mask pattern of 4 pixels by 4 pixels is used for printing in an area larger than the mask pattern, the mask pattern can be used by tiling it to the size of the printing target area. For example, in order to print in an area of 8 pixels by 8 pixels, tiling of four mask patterns of 4 pixels by 4 pixels can be used as shown in FIG. 6A to FIG. 6C.

In the base printing by the multi-pass method, the printing controller 313 arranges the nozzle 8 of the base head 41a shown in FIG. 4 so as to be positioned at the first line (line 1) in the Y direction in the printing target area, and, while causing the base head 41a to move in the main scanning direction (X direction), causes the base head 41a to eject ink (print) from the nozzle 8 onto the position "8" in the first line of the mask pattern. Next, the printing controller 313 shifts the base head 41a by one line in the sub-scanning direction (Y direction), and while causing the base head 41a to move in the main scanning direction (X direction), causes the base head 41a to eject ink from the nozzle 8 onto the position "8" in the second line of the mask pattern and from the nozzle 7 onto the position "7" in the first line of the mask pattern. Next, the printing controller 313 further shifts the base head 41a by one line in the sub-scanning direction (Y direction), and while causing the base head 41a to move in the main scanning direction (X direction), causes the base head 41a to eject ink from the nozzle 8 onto the position "8" in the third line of the mask pattern, from the nozzle 7 onto the position "7" in the second line of the mask pattern, and from the nozzle 6 onto the position "6" in the first line of the mask pattern. Such operations are repeated until the nozzle 1 reaches the last line and the ink ejection at the position "1" of the mask pattern in the main scanning direction is completed. Thus, in the multi-pass printing, scanning in the main direction is repeated each time the base head 41a is shifted in the sub-scanning direction (Y direction), and printing is performed on the printing target area by multiple scans.

In the base printing processing, superposing printings are sometimes performed in order to ensure a concealing property. In the superposing printings, after printing once, multiple printings are superposed on the first printing. In the conventional superposing printings, the same printing as the first one is repeated multiple times.

Figure 6A:
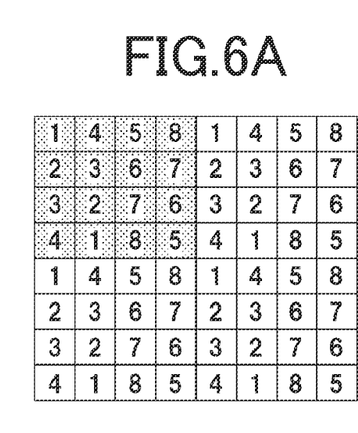
FIG. 6A is a diagram showing an example of a mask pattern of 8 pixels by 8 pixels.
Figure 6B:
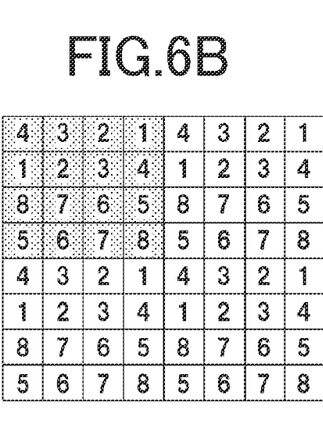
FIG. 6B is a diagram showing an example of a mask pattern that is different from the mask pattern in FIG. 6A.
Figure 6C:
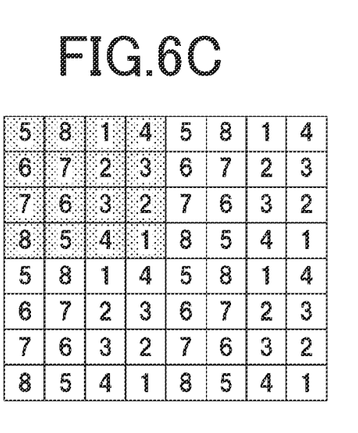
FIG. 6C is a diagram showing an example of a mask pattern that is different from the mask pattern in FIG. 6A.
Figure 7A:
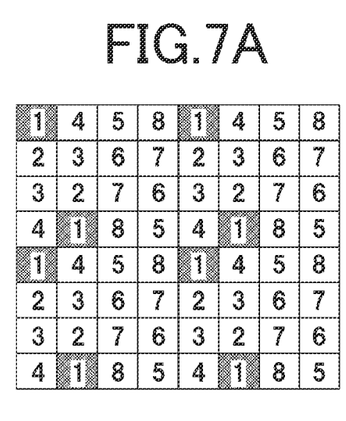
FIG. 7A is a diagram schematically showing a printing result of a first printing using the mask pattern of FIG. 6A.
Figure 7B:
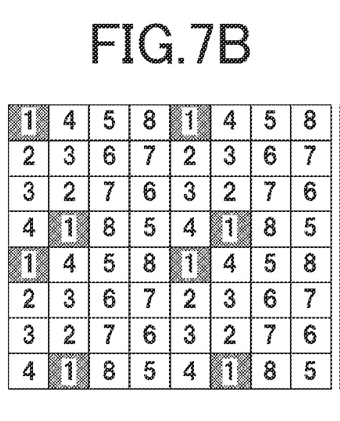
FIG. 7B is a diagram schematically showing a printing result of a second printing using the same mask pattern as the first printing.
Figure 7C:
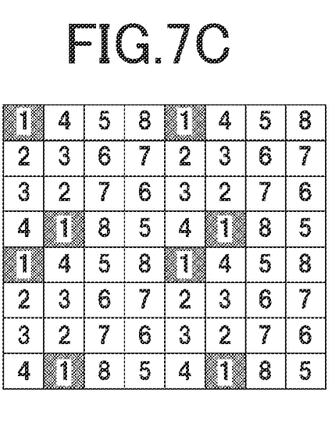
FIG. 7C is a diagram schematically showing a printing result of a third printing using the same mask pattern as the first printing.

For example, assuming that the nozzle 1 of the base head 41a is a clogged error nozzle and printing is performed in an area of 8 pixels by 8 pixels using the mask pattern shown in FIG. 6A, for example, as a result of the first printing, ink does not land on a position (pixel position) where ink is to be ejected from the error nozzle (the nozzle 1), and the surface of the printing target at the position is visible as shown in FIG. 7A. Here, the hatched portions in FIG. 7A to FIG. 7C are the positions where no ink lands. Also, the density of the base is not sufficient with printing only once. As a result, concealing property is not ensured, and the coloring property of the ink for design printing is poor due to the color of the printing target itself (ground color), resulting in poor finish quality.

Figure 7D:
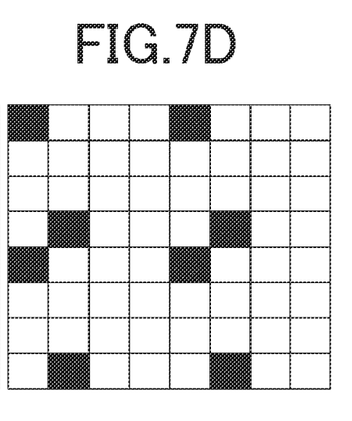
FIG. 7D is a diagram schematically showing an example of a printing result of three superposing printings using the mask pattern of FIG. 6A.

Therefore, in order to apply a thick base, superposing printings are performed using a conventional method. However, as the second printing is performed in the same way as the first printing in the conventional superposing printing method, ink does not land on the position where ink is to be ejected from the nozzle 1 in the second printing as well, as shown in FIG. 7B. Even after the third printing in the same manner, ink does not land on the position where ink is to be ejected from the nozzle 1 in the second printing, as shown in FIG. 7C. Thus, when superposing printings are performed three times repeatedly by the conventional method, ink lands all three times on the position(s) where ink can land, while ink remains unlanded on the position(s) where ink cannot land. Therefore, as shown in FIG. 7D, the difference in color becomes large between the positions where ink can land and the positions where ink cannot land.

Therefore, in the present embodiment, control in the superposing printings for the base printing is performed such that ink from at least one of the nozzles 1 to 8 is ejected onto different positions for each of the printings.

Figure 8:
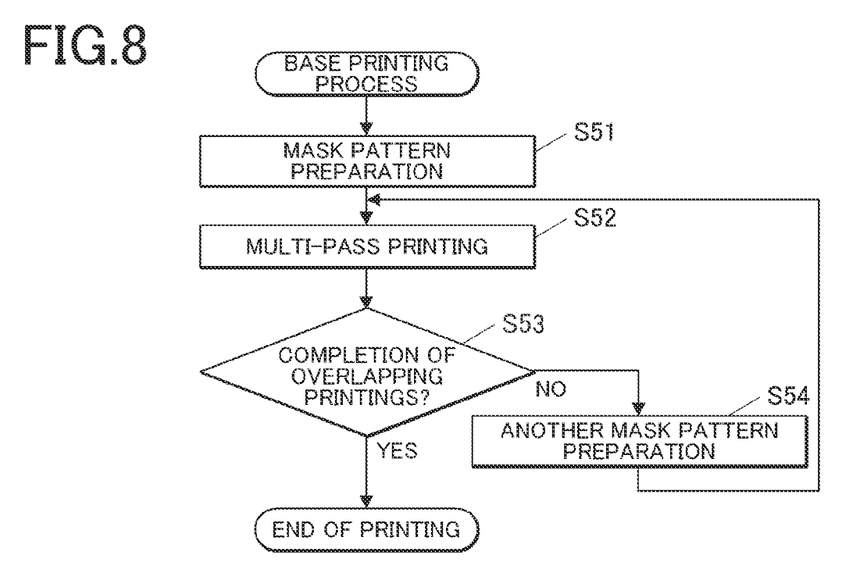
FIG. 8 is a flowchart showing a flow of base printing processing performed in step S5 in FIG. 3 by the printing controller in FIG. 2.

FIG. 8 is a flowchart showing a flow of the base printing processing performed by the printing controller 313 in step S5 in FIG. 3. Hereinafter, the base printing processing performed by the printing controller 313 is explained.

First, the printing controller 313 prepares a mask pattern to be used in multi-pass printing (Step S51). For example, a mask pattern is stored in the storage 32 in advance, and the printing controller 313 reads the mask pattern from the storage 32 in step S51. Alternatively, a mask pattern may be generated in step S51. The mask pattern may be a dedicated mask pattern for multi-pass printing, or a blue noise mask for halftone processing may be used as a mask pattern for multi-pass printing.

Next, the printing controller 313 controls the X direction movement motor 46, the Y direction movement motor 46, and the base head 41a based on the base printing data and the prepared mask pattern, to perform the base printing by the multi-pass printing in the printing target area of the nail placed on the finger holder 6 (step S52).

Next, the printing controller 313 determines whether or not the predetermined number of times (e.g., three times) of superposing printings have been completed (Step S53).

For example, a predetermined numerical value is set in a counter, and 1 is subtracted from the predetermined numerical value each time multi-pass printing is completed. When the numerical value in the counter becomes 0, it is determined that superposing printings of the predetermined number of times have been completed. Alternatively, a numerical value of 0 is set in the counter, and 1 is added to the counter each time multi-pass printing is completed. When the numerical value in the counter becomes a predetermined value, it is determined that superposing printings of the predetermined number of times have been completed.

If it is determined that the superposing printings of the predetermined number of times have not been completed (step S53; NO), the printing controller 313 prepares another mask pattern (Step S54), returns to Step S52, and performs multi-pass printing using the prepared mask pattern.

In step S54, the printing controller 313 may rotate (for example, rotate by 90 degrees), flip (for example, left-right flip), replace the numbers of, and the like, the mask pattern used in step S52 to generate another mask pattern different from the one used so far. Alternatively, multiple different mask patterns may be prepared and stored in storage 32 in advance, and then the mask pattern different from the mask pattern used so far may be read out.

The printing controller 313 repeatedly performs the processes of steps S52 to S54 until determining that the superposing printings of the predetermined number of times have been completed. When it is determined that the superposing printings of the predetermined number of times have been completed (step S53; YES), the printing controller 313 ends the base printing processing.

Figure 9A:
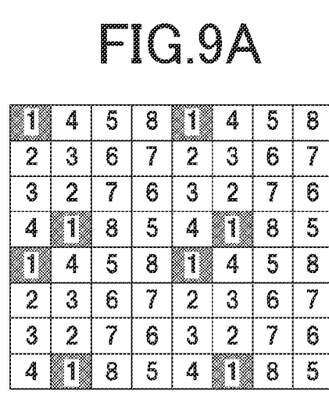
FIG. 9A is a diagram schematically showing a printing result of a first printing using the mask pattern of FIG. 6A.
Figure 9B:
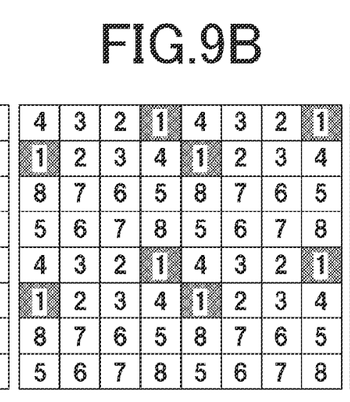
FIG. 9B is a diagram schematically showing a printing result of a second printing using the mask pattern of FIG. 6B.
Figure 9C:
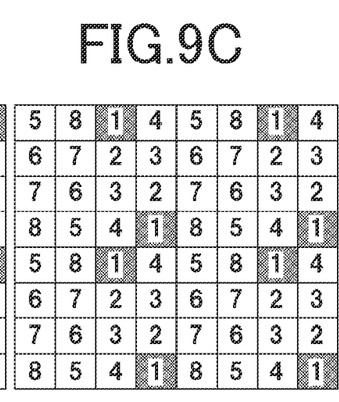
FIG. 9C is a diagram schematically showing a printing result of a third printing using the mask pattern of FIG. 6C.

With reference to FIG. 9A to FIG. 9D, the printing results of the above base printing processing will be explained, for example, when three superposing printings are performed in an area of 8 pixels by 8 pixels using the base head 41a having eight nozzles as shown in FIG. 4. The gray portions in FIG. 9A to FIG. 9C are the positions where ink does not land. In the following explanation, nozzle 1 is an error nozzle, the mask pattern shown in FIG. 6A is used for the first printing, the mask pattern shown in FIG. 6B is used for the second printing, and the mask pattern shown in FIG. 6C is used for the third printing.

In the first printing, ink does not land on positions (pixel positions) where ink is to be ejected from nozzle 1 as shown in FIG. 9A. In the second printing, the mask pattern is changed to the one shown in FIG. 6B, so the positions where ink is to be ejected from each nozzle are different from those in the first printing, as shown in FIG. 9B. In the third printing, the mask pattern is changed to the one shown in FIG. 6C, so the positions where ink is to be ejected from each nozzle are different from those in the first printing or in the second printing, and the positions where ink does not land are different from those in the first printing or in the second printing, as shown in FIG. 9C.

Figure 9D:
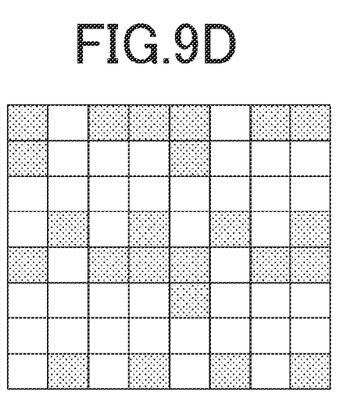
FIG. 9D is a diagram schematically showing an example of a printing result of three superposing printings using the mask patterns of FIG. 6A to FIG. 6C.

FIG. 9D shows the result of superposing printings of three times by the above base printing processing. As shown in FIG. 9D, there are no pixels where no ink has landed at all, that is, lacking of ink application, have been eliminated, and the concealing property has been improved. Therefore, the ground color of the printing target has less influence on the design printing, and the coloring property of ink can be improved. Also, it is possible to reduce roughness caused by the coexistence of areas where no ink is ejected and areas where ink is ejected.

Preferably, all the positions where ink is to be ejected from each of the nozzles (that is, the positions where ink is supposed to be ejected) for the first, second, and third times (that is, in each printing) are different from each other. However, even if some of the positions are the same, the concealing effects can be exhibited when many of the positions are different from each other. Therefore, for example, a different mask pattern is used for each printing in the base printing processing such that ink from at least one of the plurality of nozzles in the base head 41a is ejected at different positions in the superposing printings of a plurality of times.

As described above, according to the printing device 1, the printing controller 313 performs control in the superposing printings of a plurality of times in the printing target area such that ink from at least one of the nozzles of the base head 41a is ejected at different positions for each of the printings.

Therefore, lacking of ink application due to nozzle failure can be reduced. As a result, the concealing property and the ink coloring property can be improved because the ground color of the printing target less affects the design printing. Also, it is possible to reduce the roughness due to coexistence of areas where no ink is ejected and areas where ink is ejected.

For example, the printing controller 313 controls ejection of ink from the plurality of nozzles based on a mask pattern that specifies from which of the nozzles ink is to be ejected onto each position in the printable area by the printing device 1. In superposing printings of a plurality of times in the printing target area, a different mask pattern is used for each printing such that ink from at least one of the nozzles is controlled to be ejected onto a different position for each printing. Therefore, even when the position of the defective nozzle is not known, lacking of ink application due to nozzle defects can be easily reduced.

Also, in superposing printings of a plurality of times in the printing target area, the printing controller 313 generates a plurality of different mask patterns, for example, by rotating or reversing the mask pattern used in the first printing, and uses a different mask pattern for each printing. As a result, there is no need to store a plurality of mask patterns, and the storage capacity of the mask pattern can be reduced. Alternatively, in printings of a plurality of times, the printing controller 313 may generate different (a plurality of) mask patterns in the second or later printing by rotating or reversing the mask pattern used in the previous printing.

When a plurality of different mask patterns has been stored in the storage 32, and the printing controller 313 reads different mask pattern for each printing from the storage 32 to use them in the superposing printings of a plurality of times in the printing target area, it is not necessary to generate different mask pattern for each printing.

The printing controller 313 controls the base head 41a to print on the fixed printing target area by ejecting ink from the nozzles while causing the base head 41a to move in the main scanning direction and in the sub-scanning direction. When the base head 41a ejects ink from the same nozzle onto the same pixel position in superposing printings of a plurality of times where pixel positions of the printing target area are the same, no printing is performed at the position where ink is to be ejected from a defective nozzle (error nozzle), resulting in lacking of ink application. However, by the control such that ink from at least one of the plurality of nozzles is ejected at a different position for each printing, lacking of ink application can be reduced.

The printing device 1 is a nail printing device that prints on a nail as the printing target, and the printing target area corresponds to the area of the nail detected based on a photographed image acquired by the photographing unit 50. While moving the base head 41a, the printing controller 313 controls the base head 41a to print on the printing target area by ejecting ink from one of a plurality of nozzles on each position of the printing target area. Then, in the superposing printings of a plurality of times in the printing target area, the printing controller 313 performs control such that base ink from at least one of the nozzles is ejected at a different position for each of the printings. Therefore, lacking of base application in the nail printing device can be reduced, the concealing property is improved, and ink coloring property in printing the design can be improved. Also, it is possible to reduce the roughness due to coexistence of areas where no ink is ejected and areas where ink is ejected.

Although the embodiments of the present invention have been described above, it goes without saying that the present invention is not limited to these embodiments and that various modifications can be made without departing from the gist of the invention.

For example, in the present embodiment, the entire printing head 41 (both the base head 41a and the design head 41b) is mounted on a single carriage 42 and moved by the same head movement mechanism 49, but the configuration of the printing head 41 is not limited thereto. For example, the base head 41a and the design head 41b may be configured to perform printing operations while being moved separately.

Further, the present embodiment has been described in a case where the printing device 1 and the terminal device cooperate to print, but the printing device 1 may be configured to perform all operations alone.

In such a case, the printing device 1 may have a display such that the user can check the image and design of the nail.

Further, for example, the storage 32 of the printing device 1 may have a design storage area that stores nail designs, and the designs stored in the storage 32 may be presented to the user so that the user can select one of the designs.

When the printing device 1 can be connected to various networks, the printing device 1 may be able to import nail designs (designs) stored in a server or other device (not shown in the drawings) that is connectable to the network. When designs acquired from external sources in this way can be presented to the user as potential nail design options, it is possible to print a wide variety of nail designs on the nail.

Further, in the present embodiment, processes such as detection of nail information and generation of printing data are described as being performed by the controller 81 of the terminal device 7, but do not necessarily have to be performed entirely in the terminal device 7. Some or all of these processes may be performed by the controller 31 of the printing device 1.

In this way, when the various processes are configured to be performed separately on the printing device 1 and the terminal device 7, the load on the control devices 30 and 80 (in terms of the processing ability of the controllers 31 and 81 and the memory capacity of the storage 32 and 82) can also be separated, reducing the burden on each part.

In the above embodiment, in the superposing printings of a plurality of times in the printing target area, a different mask pattern is used for each printing such that ink from at least one of the plurality of nozzles is controlled to be ejected onto different position for each printing. However, superposing printings may be performed using other methods. For example, when the position of an error nozzle (that is, a defective nozzle) has been already known, the printing controller 313 may perform control such that the position where ink is to be ejected from at least the error nozzle is different for each printing. Alternatively, for example, the printing controller 313 may identify the position of the error nozzle by photographing the printing target area after the first printing, analyze the photographed image, and then perform control such that the position where ink is to be ejected from at least the identified error nozzle is different for each printing.

In the above embodiment, the superposing printings are performed in the base printing such that ink from at least one of the plurality of nozzles is controlled to be ejected at a different position each printing, but such control may be also performed in nail design printing.

Although several embodiments of the present invention have been described above, the scope of the present invention is not limited to the embodiments described above, but includes the scope of the present invention described in the claims and the scope of their equivalents.

What is claimed is:

1. A printing device comprising:
   a printing head that has a plurality of nozzles;
   a movement mechanism that moves the printing head; and
   at least one processor that:
      controls the printing head to eject ink from each of the plurality of nozzles and to print on each position in a printing target area while causing the movement mechanism to move the printing head,
      determines whether or not a predetermined number of superposing printings are completed in the printing target area based on a mask pattern, the mask pattern being data used in specifying from which of the plurality of nozzles ink is ejected onto each position in a printable area by the printing device, and
      controls, upon determining that the predetermined number of superposing printings are not completed, the printing head to eject ink from at least one of the plurality of nozzles onto a different position from a position in a previous printing based on a different mask pattern from a mask pattern in the previous printing.

2. The printing device according to claim 1,
   wherein, upon the predetermined number of superposing printings in the printing target area, the processor rotates a mask pattern in the previous printing to generate the different mask pattern, and controls the printing head to eject ink based on the different mask pattern.

3. The printing device according to claim 1, further comprising a memory that stores a plurality of mask patterns,
   wherein, upon the predetermined number of superposing printings in the printing target area, the processor reads and uses a different mask pattern among the plurality of mask patterns in the memory for each of the predetermined number of superposing printings.

4. The printing device according to claim 1,
   wherein the movement mechanism moves the printing head in a main scanning direction and in a sub-scanning direction with respect to the printing target area that has been fixed, and
   wherein the processor controls the printing head to eject ink from each of the plurality of nozzles while causing the movement mechanism to move the printing head in the main scanning direction and in the sub-scanning direction, and to print on the printing target area that has been fixed.

5. The printing device according to claim 1 that is a nail printer that prints on a nail as a printing target, further comprising:
   a finger holder configured to hold a finger corresponding to the nail; and
   a camera that photographs an image of an area including the nail of the finger held by the finger holder,
   wherein the printing head ejects base ink on a surface of the nail from the plurality of nozzles,
   wherein the processor controls the printing head to print on the printing target area by ejecting the base ink onto each position in the printing target area from any of the plurality of nozzles while the movement mechanism moves the printing head with respect to the printing target area corresponding to an area of the nail that has been detected based on the image, and
   wherein, upon the predetermined number of superposing printings in the printing target area, the processor controls the printing head to eject the base ink from at least one of the plurality of nozzles onto a different position for each of the predetermined number of superposing printings.

6. A print controlling method performed by a printing device having a printing head that has a plurality of nozzles and a movement mechanism that moves the printing head, the printing device prints on each position in a printing target area by causing the printing head to eject ink from each of the plurality of nozzles while causing the movement mechanism to move the printing head, the method comprising:
   determining whether or not a predetermined number of superposing printings are completed in the printing target area based on a mask pattern, the mask pattern being data used in specifying from which of the plurality of nozzles ink is ejected onto each position in a printable area by the printing device, and
   controlling, upon determining that the predetermined number of superposing printings are not completed, the printing head to eject ink from at least one of the plurality of nozzles onto a different position from a position in a previous printing based on a different mask pattern from a mask pattern in the previous printing.

7. The print controlling method according to claim 6,
   wherein, upon predetermined number of the superposing printings in the printing target area, the different mask pattern that is a rotation of the mask pattern in the previous printing is generated, and the printing head ejects ink based on the different mask pattern.

8. The print controlling method according to claim 6,
wherein the printing device has a memory that stores a plurality of mask patterns, and
wherein, upon the predetermined number of superposing printings in the printing target area, a different mask pattern among the plurality of mask patterns in the memory is read and used for each of the predetermined number of superposing printings.

9. The print controlling method according to claim 6,
wherein the movement mechanism moves the printing head in a main scanning direction and in a sub-scanning direction with respect to the printing target area that has been fixed, and
wherein the printing head is controlled to eject ink from each of the plurality of nozzles while the movement mechanism moves the printing head in the main scanning direction and in the sub-scanning direction, and is controlled to print on the printing target area that has been fixed.

10. The print controlling method according to claim 6, wherein
the printing device is a nail printer that prints on a nail as a printing target,
the printing device has:
  a finger holder configured to hold a finger corresponding to the nail; and
  a camera that photographs an image of an area including the nail of the finger held by the finger holder,
the printing head ejects base ink on a surface of the nail from the plurality of nozzles, and
the printing head is controlled to print on the printing target area by ejecting the base ink onto each position in the printing target area from any of the plurality of nozzles while the movement mechanism moves the printing head with respect to the printing target area corresponding to an area of the nail that has been detected based on the image, and
upon the predetermined number of superposing printings in the printing target area, the printing head is controlled to eject the base ink from at least one of the plurality of nozzles onto a different position for each of the predetermined number of superposing printings.

11. A non-transitory computer-readable storage medium storing a program for a printing device that has a printing head that has a plurality of nozzles and a movement mechanism that moves the printing head, the printing device prints on each position in a printing target area by causing the printing head to eject ink from each of the plurality of nozzles while causing the movement mechanism to move the printing head, the program causing a computer to perform:
determining whether or not a predetermined number of superposing printings are completed in the printing target area based on a mask pattern, the mask pattern being data used in specifying from which of the plurality of nozzles ink is ejected onto each position in a printable area by the printing device, and
controlling, upon determining that the predetermined number of superposing printings are not completed, the printing head to eject ink from at least one of the plurality of nozzles onto a different position from a position in a previous printing based on a different mask pattern from a mask pattern in the previous printing.

* * * * *